United States Patent
Uesugi et al.

(10) Patent No.: US 8,085,038 B2
(45) Date of Patent: Dec. 27, 2011

(54) METHOD FOR TESTING NOISE OF THIN-FILM MAGNETIC HEAD, AND MAGNETIC DISK DRIVE APPARATUS WITH NOISE TESTING FUNCTION

(75) Inventors: Takumi Uesugi, Chuo-ku (JP); Takeo Kagami, Chuo-ku (JP); Tetsuro Sasaki, Chuo-ku (JP); Kei Hirata, Chuo-ku (JP); Masaru Hirose, Chuo-ku (JP); Chi Man Lee, Shatin (HK); Kwok Piu Tso, Shatin (HK)

(73) Assignees: TDK Corporation, Tokyo (JP); SAE Magnectics (H.K.) Ltd., Hong Kong (CN)

( * ) Notice: Subject to any disclaimer, the term of this patent is extended or adjusted under 35 U.S.C. 154(b) by 1250 days.

(21) Appl. No.: 11/753,836

(22) Filed: May 25, 2007

(65) Prior Publication Data
US 2008/0291579 A1  Nov. 27, 2008

(51) Int. Cl.
*G01R 33/12* (2006.01)
*G11B 5/00* (2006.01)
(52) U.S. Cl. .......................... 324/210; 360/31
(58) Field of Classification Search .................. None
See application file for complete search history.

(56) References Cited

U.S. PATENT DOCUMENTS

| | | | |
|---|---|---|---|
| 3,863,124 A * | 1/1975 | Pierce et al. | 318/638 |
| 5,991,113 A | 11/1999 | Meyer et al. | |
| 7,274,541 B2 * | 9/2007 | Oikawa et al. | 360/319 |
| 7,872,471 B2 * | 1/2011 | Yamanaka et al. | 324/210 |

FOREIGN PATENT DOCUMENTS

| | | |
|---|---|---|
| JP | 06-084116 | 3/1994 |
| JP | 2002-133621 | 5/2002 |

OTHER PUBLICATIONS

U.S. Appl. No. 11/835,049; Yamanaka et al.; filed Aug. 7, 2007; Title: "Testing Method of Head Element and Magnetic Reacording and Reproducing Apparatus Capable of Head Evaluating".
U.S. Appl. No. 11/835,927; Yamanaka et al.; filed Aug. 8, 2007; Title: "Magmetic Reproducing Method for Suppressing Low Temperature Noise".

\* cited by examiner

*Primary Examiner* — K. Wong
(74) *Attorney, Agent, or Firm* — Frommer Lawrence & Haug LLP

(57) ABSTRACT

A noise-testing method for a thin-film magnetic head with an MR read head element and a heating unit capable of applying a heat and a stress to the MR read head element, includes a step of applying alternately and discontinuously with each other an electrical power having a first level and an electrical power having a second level higher than the first level to the heating unit, and a step of evaluating the thin-film magnetic head by measuring a noise output or noise outputs obtained from the MR read head element when the electrical power or the electrical powers are applied to the heating unit.

16 Claims, 12 Drawing Sheets

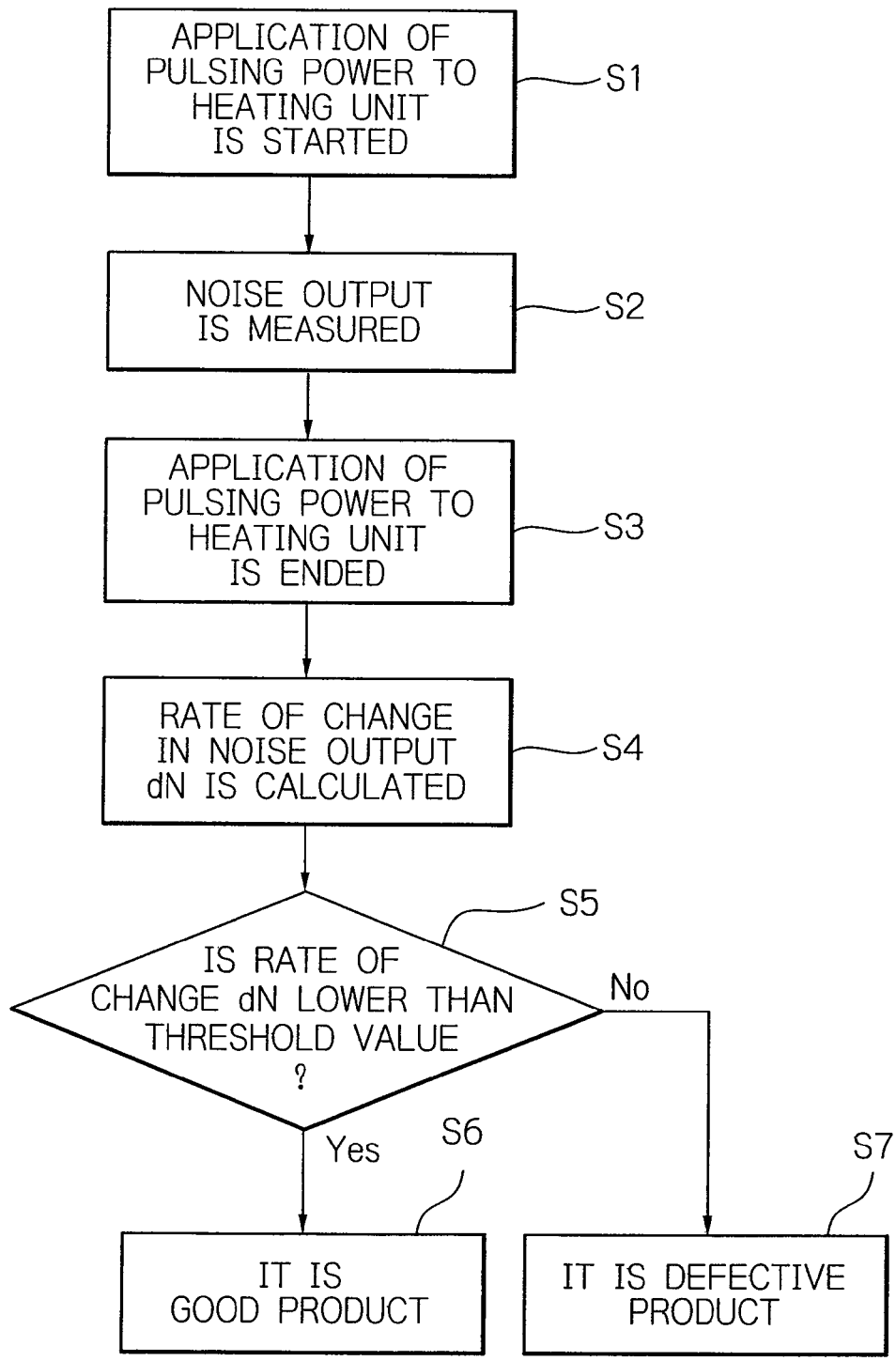

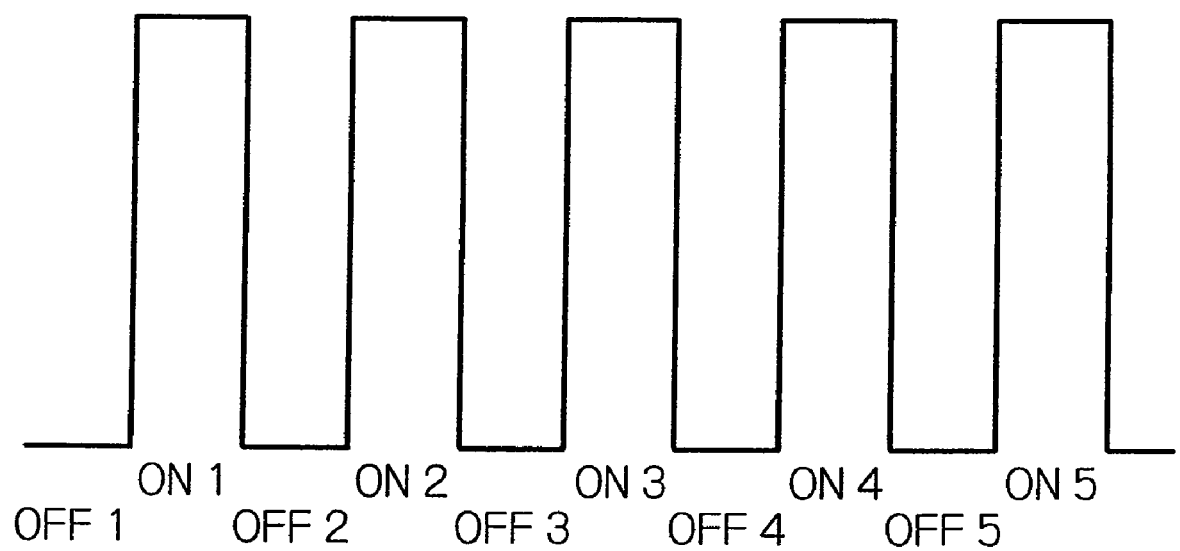

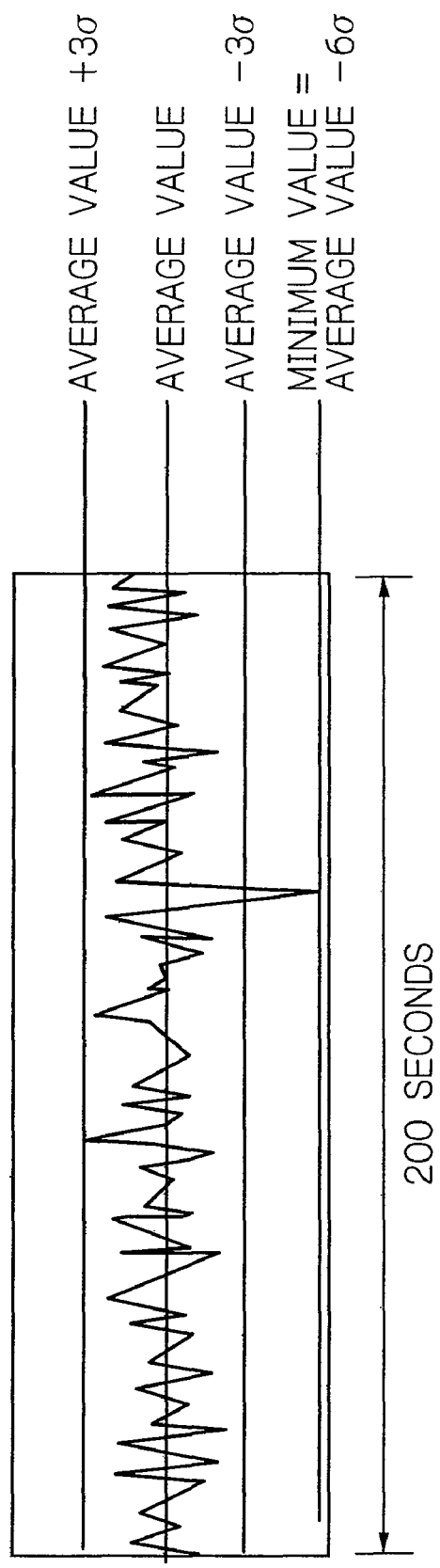

METHOD FOR TESTING NOISE OF THIN-FILM MAGNETIC HEAD, AND MAGNETIC DISK DRIVE APPARATUS WITH NOISE TESTING FUNCTION

BACKGROUND OF THE INVENTION

1. Field of the Invention

The present invention relates to a noise-testing method for a thin-film magnetic head with a magnetoresistive effect (MR) read head element to check whether the head produces noises, to a computer program product for testing a thin-film magnetic head with an MR read head element, and to a magnetic disk drive apparatus with a noise-test function.

2. Description of the Related Art

As hard disk drive apparatuses (HDD) increase in capacity and reduce in size, highly sensitive and high-resolution thin-film magnetic heads are being demanded. In order to satisfy the demand, giant magnetoresistive effect (GMR) thin-film magnetic heads with GMR read head elements each having a multi-layered structure with a magnetization-fixed layer and a magnetization-free layer become widely used. On the other hand, tunnel magnetoresistive effect (TMR) thin-film magnetic heads with TMR read head elements having higher sensitivity and higher resolution are put to practical use.

In thin-film magnetic heads with MR read head elements, defective products that generate Barkhausen noise in their outputs may be included. The Barkhausen noise is generated primarily because a magnetic domain wall is caught in defects in the magnetic film constituting the MR read head element as the magnetic domain wall moves, and is affected substantially by stress applied to the MR read head element. In practice, when an external or internal stress that exceeds a certain amount is applied, inverse magnetostriction disperses the magnetization in the MR read head element to destabilize the structure of the magnetic domains, making it more likely to cause Barkhausen noise. Such a stress can be caused by a distortion of the structure of the element itself as well as increase of deformation by the thermal expansion associated with an increase in the temperature of the element.

The influence of temperature and stress has become more remarkable than ever before especially in the aforementioned thin-film magnetic heads with MR read head elements each having the multi-layered structure.

Furthermore, in order to stably control the flying height of a thin-film magnetic head, which is set to an ultra-small value in a recent magnetic disk drive apparatus, a technique has come into adoption in which a heating element is provided within a thin-film magnetic head and the end of the head element is caused to be protruded in the direction of the magnetic disk by the heat generated by the heating element to adjust the flying height. U.S. Pat. No. 5,991,113, for example, discloses such technique. With this technique, thermal asperities and crashes are avoided to maintain good read and write characteristics. However, heat generated by such a heating element further heats the MR read head element and portions around the MR read head element, and can further increase the influence of the temperature and stress.

Approaches to preventing the Barkhausen noise in MR read head elements have been proposed. For example, Japanese Patent Publication No. 2002-133621A proposes a method for determining whether an MR read head element is acceptable or defective by measuring noise generated in response to various values of sense currents flowing through the MR element.

However, it has been very difficult to identify heads having the noise problem beforehand with the related art described above. Namely, even if a head was tested by using a sense current to cause an MR read head element itself to generate heat to induce thermal stress and was determined as non-defective heads, the head has sometimes caused Barkhausen noise under actual high-temperature conditions.

Furthermore, increasing the sense current value in order to test a head can cause an irreversible change in the MR effect element and make the testing a destructive test. This causes a serious problem especially in the case of a TMR effect element including a tunnel barrier layer, which is an ultra-thin insulation film.

In order to solve these problems, the assignee of this application has proposed, in U.S. patent application Ser. No. 11/835,049, filed on Aug. 7, 2007, a test method of a thin-film magnetic head having an MR read head element and a heating section capable of applying heat and stress to this MR read head element. According to this preceding test method proposed, characteristics of the MR read head element when the head is heated by applying an electrical power with a constant or gradually increasing value to the heating section is measured.

This test method can detect normal high-temperature noises that certainly occur when the environment temperature becomes high and disappear when the environment temperature returns. However, with respect to special kind of high-temperature noises that suddenly occur when the environment temperature becomes high and will not occur when a period under high temperature environment is short, it is impossible to detect such special high-temperature noises without application of power for a long time. This causes to take a long time for determination whether a thin-film magnetic head is good product or not and therefore it is difficult to perform such test during a fabrication process of the thin-film magnetic head.

SUMMARY OF THE INVENTION

It is therefore an object of the present invention to provide a noise-testing method for a thin-film magnetic head with an MR read head element, to a computer program product for testing a thin-film magnetic head with an MR read head element, and to a magnetic disk drive apparatus with a noise-test function, whereby the MR read head element can be appropriately evaluated by applying high temperature and large stress to the thin-film magnetic head.

Another object of the present invention is to provide a noise-testing method for a thin-film magnetic head with an MR read head element, to a computer program product for testing a thin-film magnetic head with an MR read head element, and to a magnetic disk drive apparatus with a noise-test function, whereby the evaluation can be performed in a short time.

According to the present invention, a noise-testing method for a thin-film magnetic head with an MR read head element and a heating unit capable of applying a heat and a stress to the MR read head element, includes a step of applying alternately and discontinuously with each other an electrical power having a first level and an electrical power having a second level higher than the first level to the heating unit, and a step of evaluating the thin-film magnetic head by measuring a noise output or noise outputs obtained from the MR read head element when the electrical power or the electrical powers are applied to the heating unit.

Because an electrical power having a first level and an electrical power having a second level higher than the first level is alternately and discontinuously applied with each other to the heating unit, the MR read head element is intermittently heated and an intermittent stress due to thermal expansion and contraction is applied to the MR read head element. Thus, it is possible to induce in short period of time not only normal high-temperature noises that certainly occur when the environment temperature becomes high but also special kind of high-temperature noises that suddenly occur when the environment temperature becomes high and will not occur when a period under high temperature environment is short. As a result, it is possible to easily and certainly evaluate whether the manufactured thin-film magnetic head is a noise occurred head or not in a short period of time.

It is preferred that the evaluating step includes a step of discriminating whether the thin-film magnetic head is a defective head providing noises or not by measuring a noise output from the MR read head element when the electrical power with the second level is applied to the heating unit.

It is also preferred that the evaluating step includes a step of discriminating whether the thin-film magnetic head is a defective head providing noises or not by obtaining a difference between a noise output obtained from the MR read head element when the electrical power with the first level is applied to the heating unit and a noise output obtained from the MR read head element when the electrical power with the second level is applied to the heating unit.

It is further preferred that the discriminating step includes discriminating whether the thin-film magnetic head is a defective head providing noises or not by comparing $(N_{ON}-N_{OFF})/N_{OFF}$ with a predetermined threshold value, where $N_{OFF}$ is a noise output obtained from the MR read head element when the electrical power with the first level is applied to the heating unit, and $N_{ON}$ is a noise output obtained from the MR read head element when the electrical power with the second level is applied to the heating unit. In this case, preferably, the predetermined threshold value is 0.35.

It is still further preferred that the applying step includes a step of applying to the heating unit an electrical power with the first level and a first duration and an electrical power with the second level and a second duration that is equal to the first duration.

It is further preferred that the applying step includes a step of alternately applying to the heating unit an electrical power with the first level and an electrical power with the second level for three times or more. Preferably, the applying step includes the step of alternately applying to the heating unit an electrical power with the first level and an electrical power with the second level for eight times or less.

It is further preferred that the applying step includes a step of intermittently applying to the heating unit an electrical power with the second level that is higher than zero level.

It is still further preferred that the heating unit includes a flying-height adjustment element for adjusting a flying height of the thin-film magnetic head by protruding an end face at an air bearing surface (ABS) side due to its thermal expansion.

According to the present invention, also, a computer program product for noise-testing a thin-film magnetic head with an MR read head element and a heating unit capable of applying a heat and a stress to the MR read head element, includes a computer code of applying alternately and discontinuously with each other an electrical power having a first level and an electrical power having a second level higher than the first level to the heating unit, and a computer code of evaluating the thin-film magnetic head by measuring a noise output or noise outputs obtained from the MR read head element when the electrical power or the electrical powers are applied to the heating unit.

Because an electrical power having a first level and an electrical power having a second level higher than the first level is alternately and discontinuously applied with each other to the heating unit, the MR read head element is intermittently heated and an intermittent stress due to thermal expansion and contraction is applied to the MR read head element. Thus, it is possible to induce in short period of time not only normal high-temperature noises that certainly occur when the environment temperature becomes high but also special kind of high-temperature noises that suddenly occur when the environment temperature becomes high and will not occur when a period under high temperature environment is short. As a result, it is possible to easily and certainly evaluate whether the manufactured thin-film magnetic head is a noise occurred head or not in a short period of time.

It is preferred that the evaluating computer code includes a computer code of discriminating whether the thin-film magnetic head is a defective head providing noises or not by comparing $(N_{ON}-N_{OFF})/N_{OFF}$ with a predetermined threshold value, where $N_{OFF}$ is a noise output obtained from the MR read head element when the electrical power with the first level is applied to the heating unit, and $N_{ON}$ is a noise output obtained from the MR read head element when the electrical power with the second level is applied to the heating unit.

It is also preferred that the applying computer code includes a computer code of intermittently applying to the heating unit an electrical power with the second level that is higher than zero level.

According to the present invention, further, a magnetic disk drive apparatus with a element-testing function, includes at least one magnetic disk, a thin-film magnetic head with a MR read head element for reading out data signal from the at least one magnetic disk, and a heating unit capable of applying a heat and a stress to the MR read head element, a support member for supporting the thin-film magnetic head, a unit for applying alternately and discontinuously with each other an electrical power having a first level and an electrical power having a second level higher than the first level to the heating unit, and a unit for evaluating the thin-film magnetic head by measuring a noise output or noise outputs obtained from the MR read head element when the electrical power or the electrical powers are applied to said heating unit.

Because an electrical power having a first level and an electrical power having a second level higher than the first level is alternately and discontinuously applied with each other to the heating unit, the MR read head element is intermittently heated and an intermittent stress due to thermal expansion and contraction is applied to the MR read head element. Thus, it is possible to induce in short period of time not only normal high-temperature noises that certainly occur when the environment temperature becomes high but also special kind of high-temperature noises that suddenly occur when the environment temperature becomes high and will not occur when a period under high temperature environment is short. As a result, it is possible to easily and certainly evaluate and discriminate whether the thin-film magnetic head mounted in the magnetic disk drive apparatus occurs noises or not in a short period of time.

It is preferred that the evaluating unit includes a unit for discriminating whether the thin-film magnetic head is a defective head providing noises or not by comparing $(N_{ON}-N_{OFF})/N_{OFF}$ with a predetermined threshold value, where $N_{OFF}$ is a noise output obtained from the MR read head element when the electrical power with the first level is applied to the heating unit, and $N_{ON}$ is a noise output obtained from the MR read head element when the electrical power with the second level is applied to the heating unit.

It is also preferred that the applying unit includes a unit for intermittently applying to the heating unit an electrical power with the second level that is higher than zero level.

Further objects and advantages of the present invention will be apparent from the following description of the preferred embodiments of the invention as illustrated in the accompanying drawings.

BRIEF DESCRIPTION OF THE DRAWINGS

FIG. 4 is a flow chart illustrating an example of a testing method for a thin-film magnetic head in the embodiment of FIG. 1;

FIG. 5 is a view illustrating a pulsing power applied to a heating unit;

FIG. 8 is a view illustrating how intermittent noise is detected;

DESCRIPTION OF THE PREFERRED EMBODIMENTS

Figure 1:
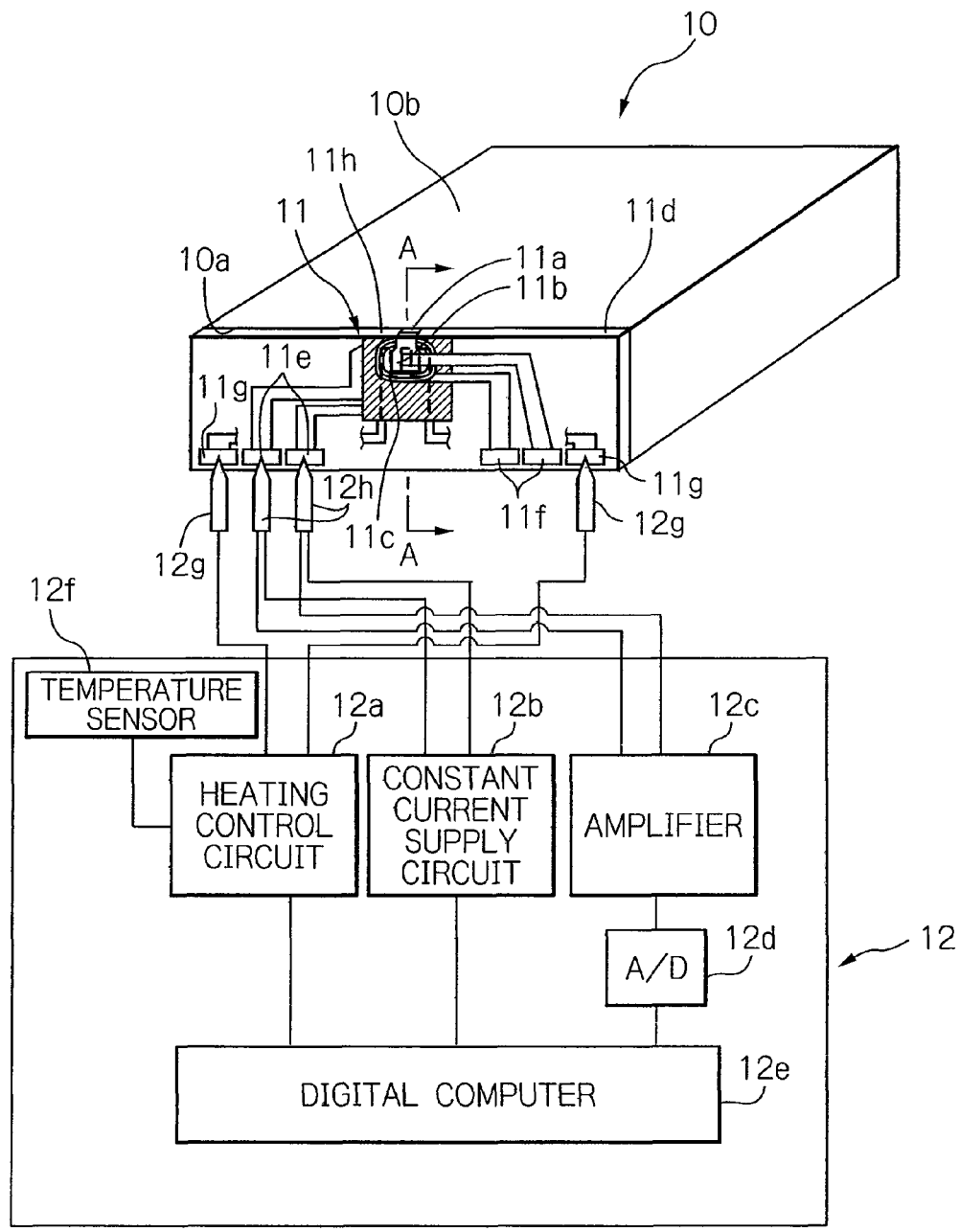
FIG. 1 is a perspective view schematically illustrating a configuration of a thin-film magnetic head of a magnetic head slider separated individually and a testing apparatus used for performing a test of the thin-film magnetic head as a preferred embodiment according to the present invention.

Hereinafter, the present invention will be described in detail with reference to the attached drawings. In each drawing, the same components have the same reference numerals, respectively. Dimensions and ratios of dimensions in each component and among the components in these drawings are optionally determined in an easy-to-understand way.

FIG. 1 schematically illustrates a configuration of a thin-film magnetic head of a magnetic head slider separated individually and a testing apparatus used for performing a test of the thin-film magnetic head as a preferred embodiment according to the present invention.

In the figure, reference numeral 10 denotes a magnetic head slider individually separated. On an element-formation surface 10a that is a trailing surface of this magnetic head slider 10, a thin-film magnetic head 11 is formed. An air bearing surface (ABS) 10b shaped to obtain an appropriate flying height is formed on the magnetic head slider 10 to become substantially perpendicular to the element-formation surface 10a.

This thin-film magnetic head 11 has an MR read head element 11a for reading out data signal recorded on a magnetic disk, an inductive write head element 11b for writing data signal onto the magnetic disk, a heating unit or heater unit 11c for applying heat and stress to the thin-film magnetic head itself, a coating layer 11d formed on the element-formation surface 10a to cover the MR read head element 11a, the inductive write head element 11b and the heating unit 11c, tow pairs of signal-terminal electrodes 11e and 11f exposed out of the coating layer 11d, and a pair of drive-terminal electrodes 11g exposed out of the coating layer 11d.

As will be described later, the heating unit 11c is located in this embodiment between the MR read head element 11a and the inductive write head element 11b, and is heated when applying current. In the MR read head element 11a, a large inner stress will be induced due to thermal expansion of the head element itself caused by heat from the heating unit 11c and thermal expansion of layers surrounding the head element in addition to its inherent inner strain. According to this embodiment, under this situation, a level of noises such as Barkhausen noises contained in an output from the MR read head element 11a are measured to discriminate a thin-film magnetic head potentially having a specific strain itself that may cause noises under a high temperature environment.

The two drive-terminal electrodes 11g electrically connected to this heating unit 11c are located at both side regions of the four signal-terminal electrodes 11e and 11f. This arrangement is effective to prevent crosstalk between traces of the MR read head element 11a and traces of the inductive write head element 11b. However, if an occurrence of certain level crosstalk is allowed, these two drive-terminal electrodes 11g may be arranged between any two of the four signal-terminal electrodes 11e and 11f. The number of these terminal electrodes is not limited to that shown in FIG. 1. For example, although six terminal electrodes are provided in the embodiment shown in FIG. 1, five terminal electrodes including only one drive-terminal electrode may be provided in modifications. In the latter case, a slider substrate will be used as a ground.

The heating unit 11c in this embodiment is in fact a flying-height adjustment element for adjusting a flying height of the thin-film magnetic head 11 above the magnetic disk. When the heating unit 11c is heated by flowing current there through, the head element itself or layers surrounding the head element is thermally expanded and therefore an ABS side face 11h of the thin-film magnetic head is lifted up to protrude toward the ABS direction. Adjusting a power provided to the heating unit 11c controls this protruding operation and thus adjusts the flying height.

Figure 2:
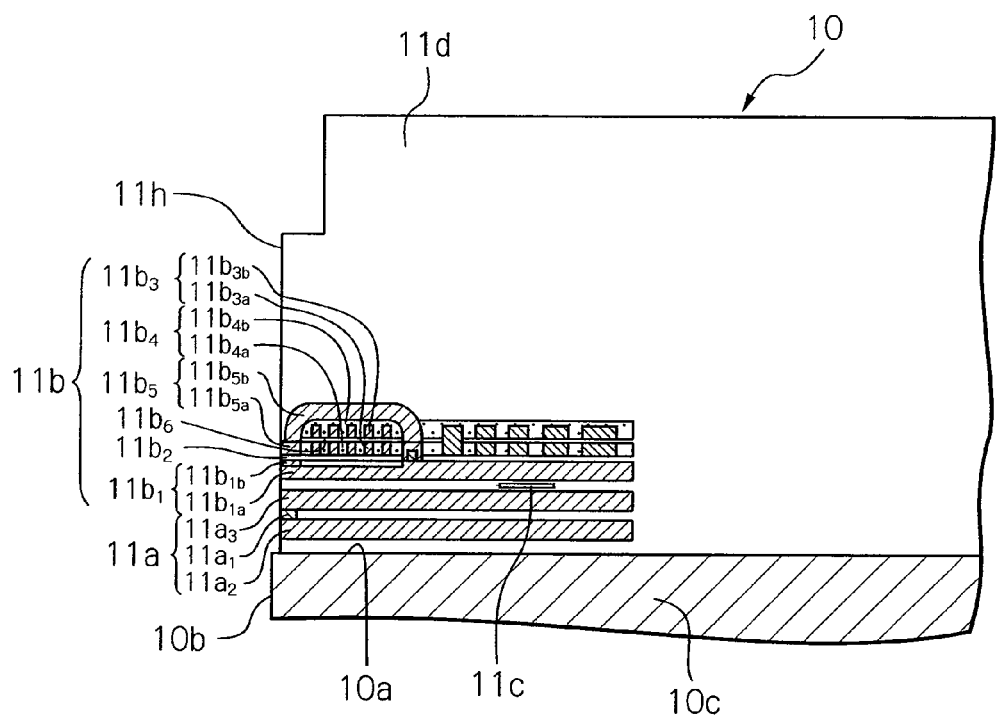
FIG. 2 is an A-A line sectional view of FIG. 1, illustrating a configuration of a main part of the thin-film magnetic head shown in the embodiment of FIG. 1.
Figure 3:
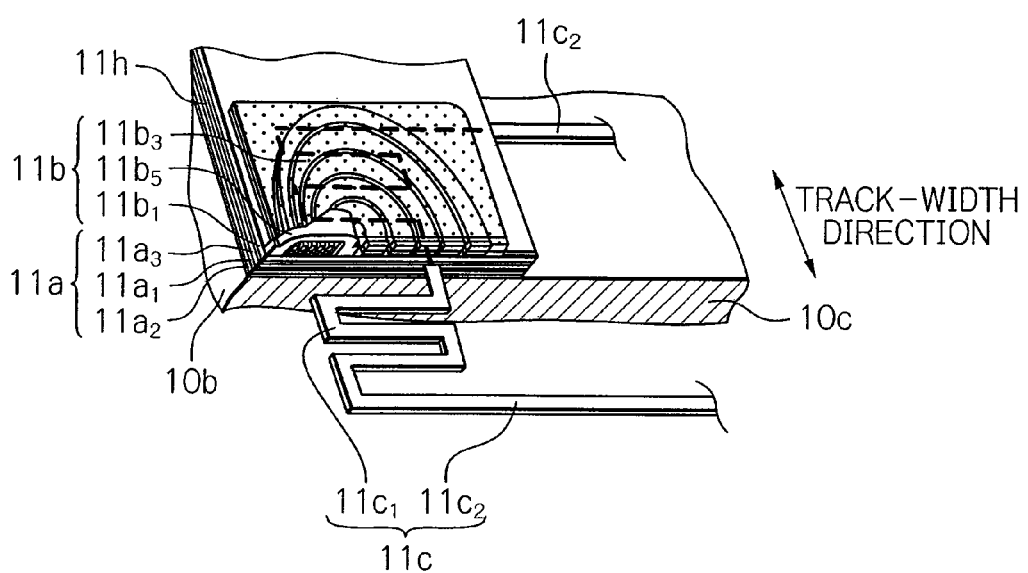
FIG. 3 is a perspective view illustrating the A-A line section of FIG. 1.

FIG. 2 shows an A-A line section of FIG. 1 and illustrates a configuration of a main part of the thin-film magnetic head shown in the embodiment of FIG. 1, and FIG. 3 shows this A-A line section.

In these figures, reference numeral 10c denotes a substrate made of AlTiC ($Al_2O_3$—TiC) for a magnetic head slider 10. The substrate 10c has an ABS 10b opposing to a magnetic disk surface in operation and an element-formation surface 10a that is one side surface if the ABS 10b is considered as the bottom surface. On the element-formation surface 10a, the thin-film magnetic head 11 including the MR read head element 11a, the inductive write head element 11b, the heating unit 11c and the coating layer 11d for protecting these elements is formed.

The MR read head element 11a includes an MR multi-layered structure $11a_1$, lower and upper shield layers $11a_2$ and $11a_3$ arranged to sandwich the MR multi-layered structure. The lower and upper shield layers $11a_2$ and $11a_3$ are formed from using for example a pattern plating method such as a frame plating method a magnetic metal material such as nickel iron or parmalloy (NiFe), cobalt iron nickel (CoFeNi), cobalt iron (CoFe), iron nitride (FeN) or iron zirconium nitride (FeZrN) with a thickness of about 0.5 to 3 µm.

The MR multi-layered structure $11a_1$ consists of CIP-GMR (current in plane giant magnetoresistive effect) multi-layered films, CPP-GMR (current perpendicular to plane giant magnetoresistive effect) multi-layered films or TMR (tunnel magnetoresistive effect) multi-layered films and can receive magnetic field signal from the magnetic disk with an extremely high sensitivity. The lower and upper shield layers $11a_2$ and $11a_3$ are formed to prevent the MR multi-layered structure $11a_1$ from being influenced by external magnetic field that may be noises.

In case that the MR multi-layered structure $11a_1$ is formed by a CIP-GMR multi-layered films, a lower shield gap layer and an upper shield gap layer are arranged between the lower shield layer $11a_2$ and the MR multi-layered structure $11a_1$ and between the MR multi-layered structure $11a_1$ and the upper shield layer $11a_3$, respectively. Also, an MR lead conductor layer for providing a sense current to the MR multi-layered structure $11a_1$ to derive a read output is formed.

In case that the MR multi-layered structure $11a_1$ is formed by a CPP-GMR multi-layered films, the lower shield layer $11a_2$ and the upper shield layer $11a_3$ also function as a lower electrode layer and an upper electrode layer, respectively. No lower shield gap layer, no upper shield gap layer nor MR lead conductor layer is necessary in this case.

Although it is not shown in these figures, an insulation layer is formed in a region located at a side of the MR multi-layered structure $11a_1$ opposite to the ABS side face 11h between the shield layers. Further, an insulation layer, or a bias insulation layer and a hard bias layer made of a ferromagnetic material for applying longitudinal magnetic bias field to stabilize magnetic domain are formed at both side faces in a track-width direction of the MR multi-layered structure $11a_1$.

The MR multi-layered structure $11a_1$ is, if it is a TMR multi-layered films, formed from an anti-ferromagnetic layer, a magnetization-fixed layer, a tunnel barrier layer and a magnetization-free layer laminated in this order. The anti-ferromagnetic layer is made of iridium manganese (IrMn), platinum manganese (PtMn), nickel manganese (NiMn) or ruthenium rhodium manganese (RuRhMn) with a thickness of about 5 to 15 nm. The magnetization-fixed layer has for example a single layer structure consisting of a ferromagnetic material film such as CoFe or a multi-layered structure consisting of a nonmagnetic material film such as ruthenium (Ru) and two ferromagnetic material films such as CoFe sandwiching the nonmagnetic material film. The magnetization direction of this layer is fixed by exchange coupling with the anti-ferromagnetic layer. The tunnel barrier layer is made of an oxide of a nonmagnetic metal material such as for example aluminum (Al), aluminum copper (AlCu) or magnesium (Mg) oxidized by oxygen introduced into a vacuum chamber or naturally oxidized with a thickness of about 0.5 to 1 nm. The magnetization-free layer has for example a two-layered structure consisting of a ferromagnetic material film such as CoFe with a thickness of about 1 nm and a ferromagnetic material film such as NiFe with a thickness of about 3 to 4 nm. The magnetization-free layer is coupled with the magnetization-fixed layer by tunnel and exchange coupling through the tunnel barrier layer.

The inductive write head element 11b is designed for longitudinal magnetic recording and includes a lower magnetic pole layer $11b_1$, a write gap layer $11b_2$, a write coil layer $11b_3$, a write coil insulation layer $11b_4$ and an upper magnetic pole layer $11b_5$. The write coil layer $11b_3$ has a two-layered structure consisting of a lower write coil layer $11b_{3a}$ and an upper write coil layer $11b_{3b}$, and is formed so as to pass in its one turn at least between the lower magnetic pole layer $11b_1$ and the upper magnetic pole layer $11b_5$. The lower magnetic pole layer $11b_1$ and the upper magnetic pole layer $11b_5$ form a guide for a magnetic flux generated by electricity applied to the write coil layer $11b_3$.

The lower magnetic pole layer $11b_1$ includes a lower yoke layer $11b_{1a}$ and a lower magnetic pole portion $11b_{1b}$ formed on the end portion of the lower yoke layer $11b_{1a}$ near the ABS side face 11h. An upper surface of the lower magnetic pole portion $11b_{1b}$ is in surface contact with the gap layer $11b_2$. The lower yoke layer $11b_1$ is formed from for example a material such as NiFe, CoFeNi, CoFe, FeN or FeZrN with a thickness of about 0.5 to 3.5 µm by using a sputtering method or a pattern plating method such as a frame plating method. The lower magnetic pole portion $11b_{1b}$ is formed from a material such as NiFe, CoFeNi, CoFe, FeN or FeZrN with a thickness of about 0.2 to 0.6 µm by using a sputtering method, for example. The saturation magnetic flux density of the lower magnetic pole portion $11b_{1b}$ is set higher than that of the lower yoke layer $11b_{1a}$, for example, at 2.0 tesla (T) or more.

The upper magnetic pole layer $11b_5$ includes an upper magnetic pole portion $11b_{5a}$ whose lower surface is in surface contact with the write gap layer $11b_2$ and an upper yoke layer $11b_{5b}$ whose end portion at the ABS side is in surface contact with the upper magnetic pole portion $11b_{5a}$. The upper magnetic pole portion $11b_{5a}$ is formed from for example a material such as NiFe, CoFeNi, CoFe, FeN or FeZrN with a thickness of about 1 to 3 µm by using a sputtering method or a pattern plating method including a frame plating method. The upper yoke layer $11b_{5b}$ is formed from for example a material such as NiFe, CoFeNi, CoFe, FeN or FeZrN with a thickness of about 0.5 to 3.0 µm by a pattern plating method including a frame plating method, for example. The saturation flux density of the upper magnetic pole portion $11b_{5a}$ is set higher than that of the upper yoke layer $11b_{5b}$, for example, at 2.0 T or more.

The lower magnetic pole portion $11b_{1b}$ and the upper magnetic pole portion $11b_{5a}$ sandwich the end of the write gap layer $11b_2$ near the ABS $10b$ (near the ABS side face $11h$). A leakage magnetic field from this end of the write gap layer $11b_2$ causes write operation onto the magnetic disk. Ultra thin coating of a material such as diamond-like carbon (DLC) is applied to the ends reaching the ABS side face $11h$ of the lower magnetic pole portion $11b_{1b}$ and upper magnetic pole portion $11b_{5a}$ for protection of the ends.

The write coil insulation layer $11b_4$ has a two-layered structure consisting of a lower write coil insulation layer $11b_{4a}$ which surrounds the lower write coil layer $11b_{3a}$ and an upper write coil insulation layer $11b_{4b}$ which surrounds the upper write coil layer $11b_{3b}$. The write coil insulation layer $11b_4$ is provided in order to electrically insulate the write coil layer $11b_4$ from the upper and lower magnetic pole layers $11b_1$ and $11b_5$. An upper-lower coil insulation layer $11b_6$ is further provided between the lower write coil layer $11b_{3a}$ with the lower write coil insulation layer $11b_{4a}$ and the upper write coil layer $11b_{3b}$ with the upper write coil insulation layer $11b_{4b}$ in order to electrically insulate them with each other. While the write coil layer $11b_3$ in FIGS. 2 and 3 has a two-layered structure, it may have a single layer structure, a three or more layered structure, or a helical coil structure.

The lower write coil layer $11b_{3a}$ and the upper write coil layer $11b_{3b}$ are formed from a material such as Cu with a thickness of about 0.3 to 5 μm by using a frame plating method, for example. The lower write coil insulation layer $11B_{4a}$ and the upper write coil insulation layer $11b_{4b}$ are resin layers formed from a resin material such as heat-cured photoresist with a thickness of about 0.5 to 7 μm by using a photolithography method, for example. The write gap layer $11_{b2}$ is an insulation layer formed from a material such as alumina ($Al_2O_3$), silicon oxide ($SiO_2$), AlN or DLC with a thickness of about 0.01 to 0.1 μm by using a sputtering method or a chemical vapor deposition (CVD) method, for example.

The heating unit $11c$ is provided near the ABS side face $11h$ between the MR read head element $11a$ and the inductive write head element $11b$ as shown in FIGS. 2 and 3. The heating unit $11c$ has a heater line layer $11c_1$ that is a line meandered in one layer like a rectangular wave, and two lead line layers $11c_2$ connected to both ends of the heater line layer $11c_1$. The heating unit $11c$ forms a current path having a given length. One end of each lead line layer $11c_2$ is connected to the drive-terminal electrode $11g$ (FIG. 1). The heating unit $11c$ is supplied with electric power for heat generation from a heating control circuit, which will be described later, through the drive-terminal electrodes $11g$. The shape of the heater line layer $11c_1$ is not limited to the meander shape, but may be in a straight-line shape, a U-shape or a spiral shape for example.

The heater line layer $11c_1$ may have a thickness of about 0.1 to 5 μm, and may be formed from a material containing nickel cupper (NiCu), nickel chromium (NiCr), tantalum (Ta), tungsten (W), titanium (Ti), cupper (Cu), gold (Au) or NiFe. The lead line layer $11c_2$ may be made of the same material as the heater line layer $11c_1$.

The testing apparatus 12 used for performing a test of the MR read head element has, as shown in FIG. 1, a heating control circuit $12a$ for supplying electric power to the heating unit $11c$ of the thin-film magnetic head and for controlling heat and stress applied by the heating unit $11c$ to the MR read head element $11a$, a constant current supply circuit $12b$ for applying a predetermined level of sense current to the MR multi-layered structure that is a magneto-sensitive section of the MR read head element $11a$, an amplifier $12c$ for amplifying an output from the MR read head element $11a$, an A/D converter $12d$ for converting the amplified analog output into a digital signal, and a digital computer $12e$ fro receiving the digital signal from the A/D converter $12d$, for obtaining a level of noise in the output of the MR read head element $11a$ to determine whether this thin-film magnetic head is good or defective, and for controlling operations of the heating control circuit $12a$ and the constant current supply circuit $12b$.

A pair of probes $12g$ is electrically connected to the heating control circuit $12a$ and is capable of being brought into contact with the two drive-terminal electrodes $11g$ in order to supply electric power to the heating unit $11c$. Another pair of probes $12h$ is electrically connected to the constant current supply circuit $12b$ and the amplifier $12c$ and is capable of being brought into contact with the two signal-terminal electrodes $11e$ in order to apply the sense current to the MR read head element $11a$ and to transmit the output from the MR read head element $11a$ to the amplifier $12c$.

The testing apparatus 12 may further have a temperature sensor $12f$ for monitoring a temperature rise caused by heat from the heating unit $11c$ in order to properly control heating operation of the heating unit $11c$.

FIG. 4 illustrates an example of a testing method for the thin-film magnetic head in the embodiment of FIG. 1, and FIG. 5 illustrates a pulsing power applied to the heating unit $11c$.

First, application of a pulsing power as shown in FIG. 5 to the heating unit $11c$ is started (Step S1). In practice, the digital computer $12e$ shown in FIG. 1 instructs the heating control circuit $12a$ to start the application of a pulsing power to the heating unit $11c$ via the probes $12g$ and the drive-terminal electrodes $11g$. Thus, the heating unit $11c$ produces heat in response to the applied pulsing power and the produced heat and stress are applied to the MR read head element $11a$.

The pulsing power is a discontinuous electrical power alternated between a low or first level and a high or second level. In this embodiment, as shown in FIG. 5, the low level and high level are repeated five times, respectively. Duration of each of the low and high levels OFF1, ON1, OFF2, ON2, OFF3, ON3, OFF4, ON4, OFF5 and ON5 is 2.5 seconds and the low level is equal to zero level. Thus, the total period of power applied to the heating unit $11c$ by five high levels becomes 25 seconds and the total power becomes 46 mW. This power corresponds to an amount of heat causing the heating unit $11c$ to rise its temperature to approximately 110° C.

Noise outputs $N_{OFF1}$ to $N_{OFF5}$ obtained from the MR read head element $11a$ when the pulsing power is in the low level and noise outputs $N_{ON1}$ to $N_{ON5}$ obtained from the MR read head element $11a$ when the pulsing power is in the high level are respectively measured and the measured levels are stored in a memory (Step S2). In practice, this measurement is performed by feeding a predetermined sense current to the MR read head element $11a$ via the probes $12h$ and the signal-terminal electrodes $11e$ from the constant current supply circuit $12b$ in response to instructions of the digital computer $12e$, then by amplifying, by means of the amplifier $12e$, output from the MR read head element $11a$ via the signal-terminal electrodes $11e$ and the probes $12h$, by converting this amplified analog output into a digital signal by means of the A/D converter $12d$, and thereafter by receiving and storing the converted digital signal into the memory in the digital computer $12e$.

Then, the application of the pulsing power to the heating unit $11c$ is ended (Step S3). Thereafter, a rate of change in the noise outputs dN is calculated and the calculated rate dN is store in the memory (Step S4). The rate dN is calculated from $dN=(N_{ON}-N_{OFF})/N_{OFF}$. In practice, this calculation is performed in the digital computer 12e shown in FIG. 1 and the calculated rate dN is store in the memory in the digital computer 12e.

Table 1 shows measured results at Step S2 and calculated results at Step S4 with respect to a certain thin-film magnetic head. Applying a pulsing power of 46 mW repeating on/off by five times performs this measurement.

TABLE 1

| | NOISE OUTPUT (Vrms) | RATE OF CHANGE IN NOISE OUTPUT dN(%) |
|---|---|---|
| $N_{OFF1}$ | 81 | 14.8 |
| $N_{ON1}$ | 93 | |
| $N_{OFF2}$ | 84 | 8.3 |
| $N_{ON2}$ | 91 | |
| $N_{OFF3}$ | 79 | 6.3 |
| $N_{ON3}$ | 84 | |
| $N_{OFF4}$ | 82 | 63.4 |
| $N_{ON4}$ | 134 | |
| $N_{OFF5}$ | 83 | 16.9 |
| $N_{ON5}$ | 97 | |

Then, it is discriminated whether all of the calculated rates of change dN are lower than a threshold value such as for example 35% or not (Step S5). If all of the calculated rates of change dN are lower than 35%, it is discriminated that this thin-film magnetic head is a good product producing no noise (Step S6). If even one of the calculated rates of change dN is equal to or higher than 35%, it is discriminated that this thin-film magnetic head is a defective product producing noises (Step S7). In practice, the digital computer 12e shown in FIG. 1 performs this discrimination and provides the discriminated results.

The thin-film magnetic head related to Table 1 is discriminated as a defective head producing noises because although no large noise output is generated at applications of first to third pulses, a large noise output $N_{ON4}$ is produced at application of fourth pulse and the rate of change in the noise output dN is higher than 35%.

In modifications of this embodiment, it is possible to use a discontinuous pulsing power alternated between a high level and a low level that is not zero level but lower than the high level.

Figure 6A:
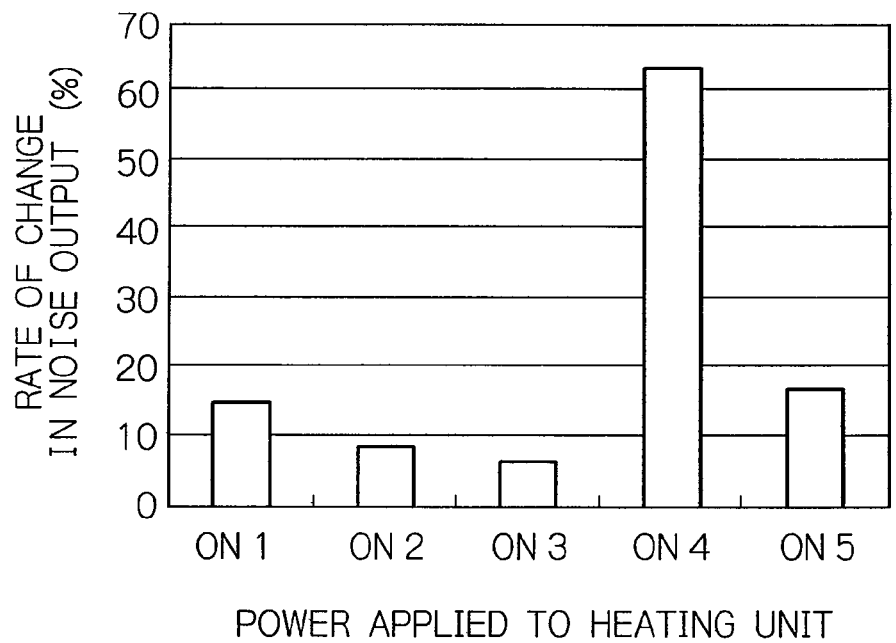
FIGS. 6a and 6b are graphs illustrating a rate of change in a noise output of a thin-film magnetic head when a testing method of this embodiment is performed and a rate of change in a noise output of a thin-film magnetic head when the preceding testing method proposed in U.S. patent application Ser. No. 11/835,049 is performed, respectively.
Figure 6B:
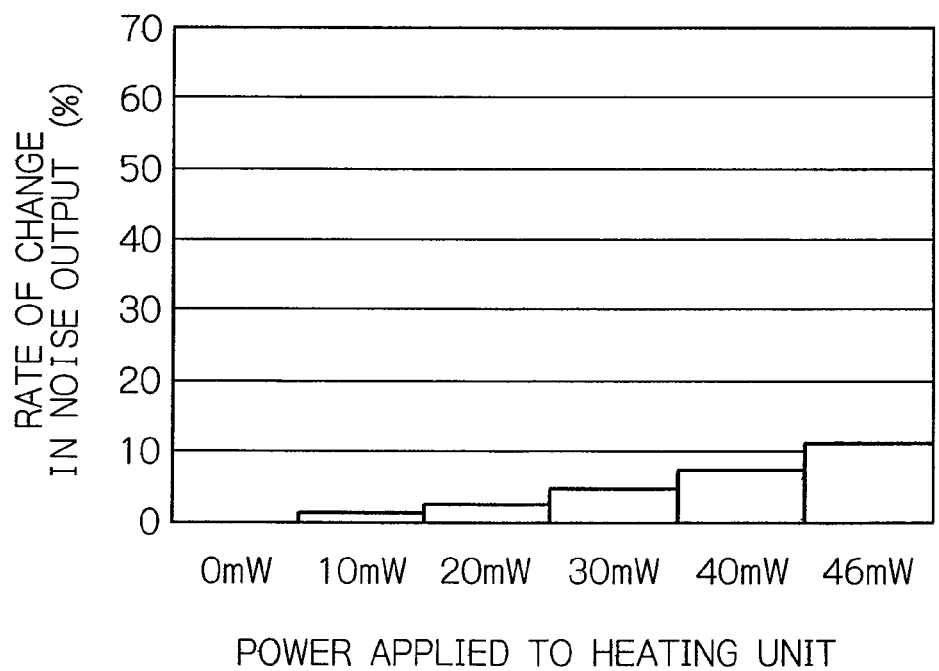

FIGS. 6a and 6b illustrate a rate of change in noise output dN of the thin-film magnetic head related to Table 1 when the testing method of this embodiment is performed and a rate of change in noise output of a thin-film magnetic head when the preceding testing method proposed in U.S. patent application Ser. No. 11/835,049 is performed, respectively.

As shown in FIG. 6b, according to the preceding testing method, because the electrical power applied to the heating unit is merely gradually increased, the rate of change in the noise output merely gradually increases depending upon increase in the applied power. Thus, even when a power of 46 mW at the maximum is applied to the heating unit, the rate of change in the noise output is up to about 11.4% that is lower than the threshold value of 30%. Therefore, according to the preceding testing method, it is impossible to detect intermittent noise that will suddenly occur when the environment temperature of the head rises high or a stress is applied to the head. Contrary to this, according to the testing method of this embodiment, as shown in FIG. 6a, since a large noise output $N_{ON4}$ occurs at application of the fourth pulse and the rate of change in the noise output dN is higher than the threshold, any intermittent noise can be detected in a short period of time.

Figure 7A:
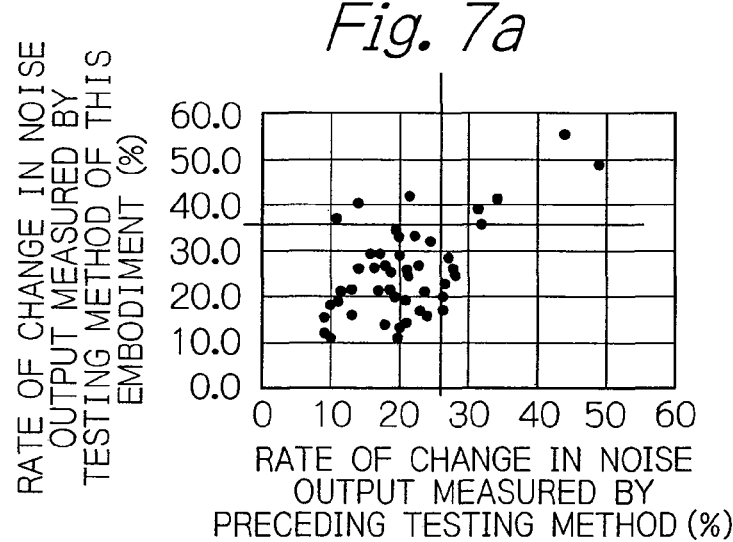
FIGS. 7a, 7b and 7c are graphs comparing measured results by performing, for a large number of thin-film magnetic heads, the testing method according to this embodiment and the preceding testing method proposed in U.S. patent application Ser. No. 11/835,049.
Figure 7B:
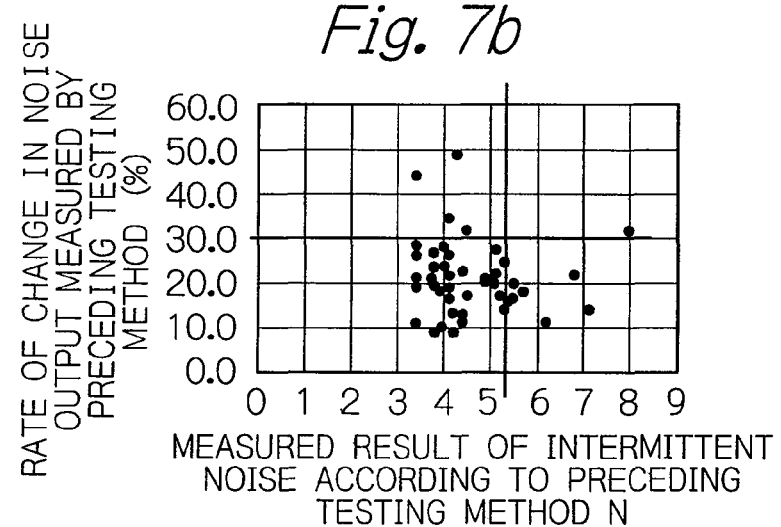
Figure 7C:
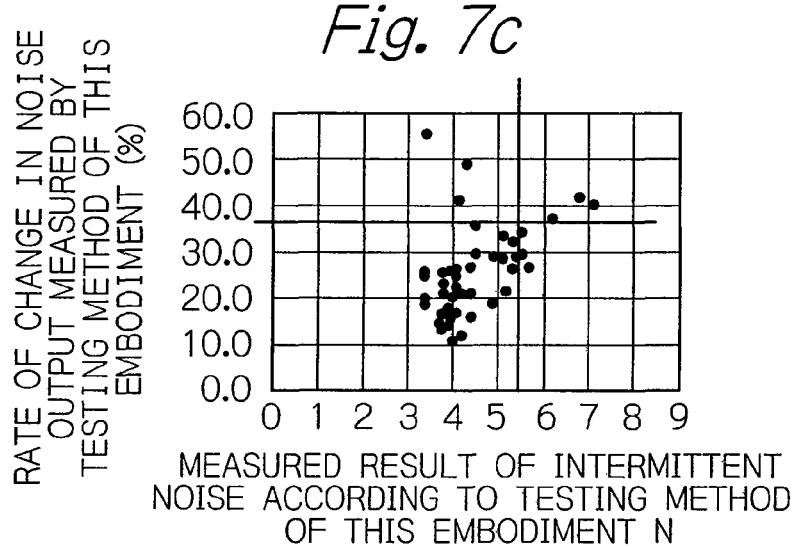

FIGS. 7a, 7b and 7c compare measured results by performing, for a large number of thin-film magnetic heads, the testing method according to this embodiment and the preceding testing method proposed in U.S. patent application Ser. No. 11/835,049. Particularly, FIG. 7a indicates a relationship between a rate of change in a noise output measured by the preceding testing method and a rate of change in a noise output measured by the testing method of this embodiment, FIG. 7b indicates a relationship between a measured result of intermittent noise according to the preceding testing method and a rate of change in a noise output measured by the preceding testing method, and FIG. 7c indicates a relationship between a measured result of intermittent noise according to the testing method of this embodiment and a rate of change in a noise output measured by the testing method of this embodiment. FIG. 8 illustrates how intermittent noise is detected.

The number of samples used in each test is 50, the rate of change in noise output dN according to the preceding testing method is a rate of change between a noise output when a power of 0 mW is applied and the maximum noise output, and the rate of change in noise output dN according to the testing method of this embodiment is the maximum one of five rates of change in noise outputs.

As will be noted from FIG. 7a, there is a high correlation in most of samples between the preceding testing method and the testing method of this embodiment. However, in some samples, although rates of change in noise output are lower than 30% and thus these samples are evaluated as good products according to the preceding testing method, rates of change in noise output are higher than 35% and thus these samples are evaluated as defective products according to the testing method of this embodiment. There is no sample evaluated as a defective sample according to the preceding testing method and evaluated as a good product according to the testing method of this embodiment.

Before explanation of FIGS. 7b and 7c, a measuring method of an intermittent noise will be described. Measuring an element resistance of an MR read head element of one thin-film magnetic head under power distribution for 200 seconds to the MR read head element performs the measurement of the intermittent noise. A difference between the maximum or minimum value and an average value of the measured element resistances obtained during the measurement period of 200 seconds, which is indicated by a multiple number N of its standard deviation ($\sigma$) is provided as a measurement result of the intermittent noise as shown in FIG. 8. In case of this figure, N=6. As for intermittent noise, a threshold of this difference indicated by a multiple number N of the standard deviation ($\sigma$) is 6.0 and therefore it is discriminated as a defective product if the difference is higher than 6.0 and as a good product if the difference is equal to or lower than 6.0.

As will be noted from FIG. 7b, there is substantially no correlation between the measured result N of intermittent noise according to the preceding testing method and rates of change in noise output dN measured by the preceding testing method. Namely, in some samples, although N>6 and thus intermittent noises occur, rates of change in noise output are lower than 30% and thus it is evaluated as good products.

Contrary to this, as will be noted from FIG. 7c, there is a high correlation between the measured result N of intermittent noise according to the testing method of this embodiment and rates of change in noise output dN measured by the testing method of this embodiment. Therefore, according to this embodiment, it is possible to certainly detect intermittent noise that will suddenly occur when the environment temperature of the head rises high or a stress is applied to the head in a short period of time of 25 seconds. On the contrary, 200 seconds is certainly required for the intermittent noise measurement according to the preceding testing method as aforementioned.

According to this embodiment, a pulsing power repeating a low level and a high level five times, respectively, is applied to the heating unit $11c$ to intermittently heat the MR read head element $11a$ and to apply an intermittent stress due to thermal expansion and contraction to the MR read head element $11a$. Thus, it is possible to induce in short period of time not only normal high-temperature noises that certainly occur when the environment temperature becomes high but also special kind of high-temperature noises that suddenly occur when the environment temperature becomes high and will not occur when a period under high temperature environment is short. Since the rate of change in noise outputs dN is obtained from noise outputs measured under this state and the obtained rate is compared with the threshold value, it is possible to easily and certainly evaluate whether the manufactured thin-film magnetic head is a noise occurred head or not in a short period of time. As a result, it is possible to adequately discriminate whether the thin-film magnetic head is good product or not to improve manufacturing yield of a thin-film magnetic head or a magnetic disk drive apparatus.

Furthermore, according to this embodiment, because the heating unit preliminarily formed in the thin-film magnetic head is utilized, the test can be easily performed without modifying the preexistent structure of the thin-film magnetic head.

Figure 9:
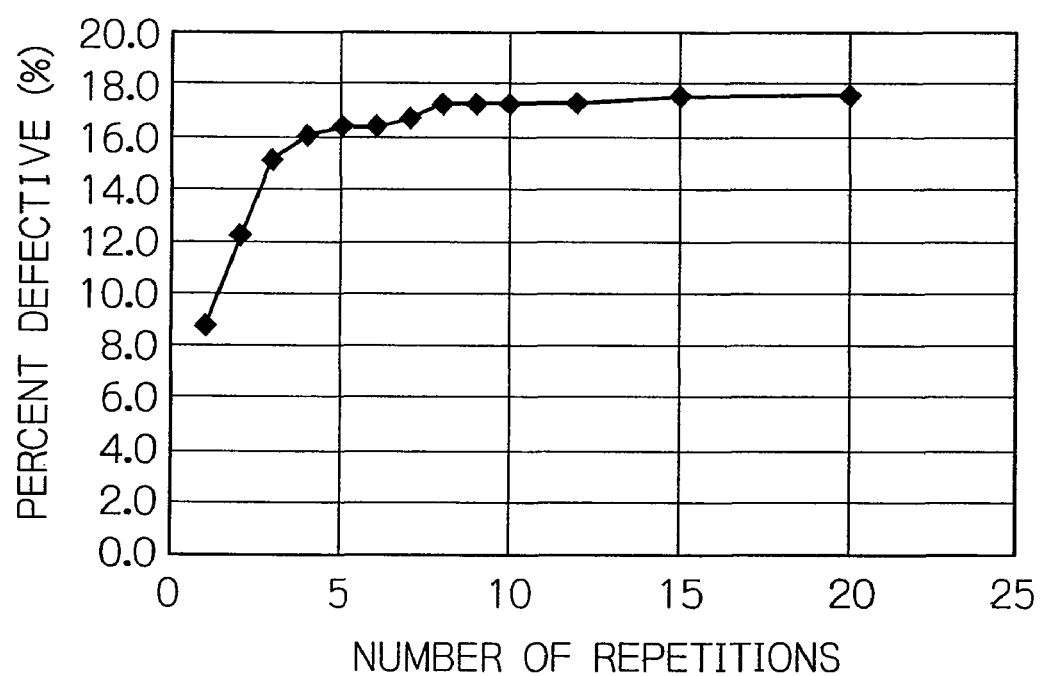
FIG. 9 is a graph illustrating a relationship between the number of repetitions of application of pulsing power to the heating unit and a percent defective.

FIG. 9 illustrates a relationship between the number of repetitions of application of pulsing power to the heating unit and a percent defective.

In the above-mentioned embodiment, a pulsing power applied to the heating unit $11c$ repeats a low level and a high level five times, respectively. However, the number of repetitions of the low level and the high level is not limited to this five. A relationship between a percent defective and the number of repetitions of the low level and the high level was actually confirmed by changing the number from one to twenty. As will be noted from FIG. 9, the minimum number of repetition required is three, and the maximum number of repetitions desired is eight because the percent defective saturates from eight or more. Thus, it is desired to repeat three to eight times.

Figure 10:
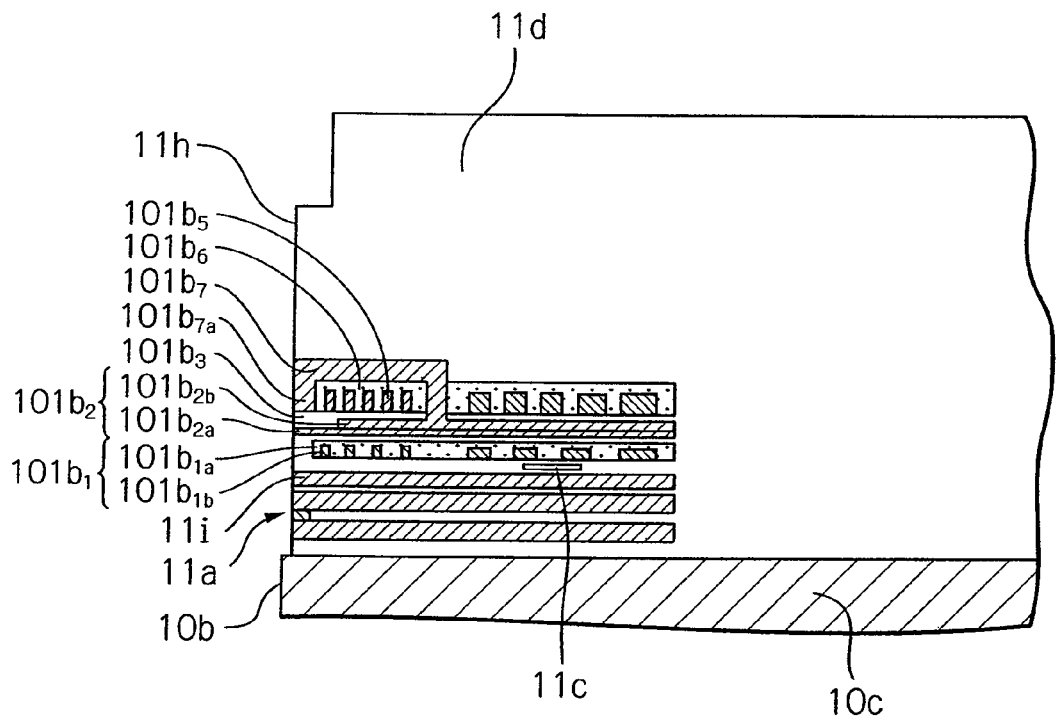
FIG. 10 is a sectional view corresponding to an A-A sectional view of FIG. 1, illustrating another configuration of a thin-film magnetic head to which a testing method according to the present invention is applicable.

FIG. 10 corresponds to an A-A sectional view of FIG. 1 and illustrates another configuration of a thin-film magnetic head to which a testing method according to the present invention is applicable.

The thin-film magnetic head in this embodiment has an inductive write head element $101b$ for a perpendicular magnetic recording. In FIG. 10, the same components as these in FIG. 2 use the same reference numerals, respectively.

As shown in FIG. 10, the inductive write head element $101b$ includes a baking coil portion $101b_1$, a main magnetic pole layer $101b_2$, a gap layer $101b_3$, a write coil layer $101b_5$, a write coil insulation layer $101b_6$, and an auxiliary magnetic pole layer $101b_7$. Provided between the inductive write head element $101b$ and the MR read head element $11a$ for reading data signals is an inter-element shield layer $11i$ that acts as a magnetic shield. A heating unit $11c$, which functions as a flying-height adjustment element, is provided near the ABS side face $11h$ between the inductive write head element $101b$ and the inter-element shield layer $11i$.

The main magnetic pole layer $101b_2$ is a magnetic flux guide for converging and guiding a magnetic flux generated by electricity applied to the write coil layer $101b_5$ to a perpendicular magnetic record layer of a magnetic disk on which data is to be written, and consists of a main magnetic pole principal layer $101b_{2a}$ and a main magnetic pole support layer $101b_{2b}$. A thickness of the end portion of main magnetic pole layer $101b_2$ of the ABS side face is equivalent to a thickness of the main magnetic pole principal layer $101b_{2a}$, and therefore, is small. As a result, an ultra-fine write magnetic field coping with increased recording density can be generated.

The end portion at the ABS side of the auxiliary magnetic pole layer $101b_7$ is a trailing shield portion $101b_{7a}$ that has a wider cross-section than the other portions of the auxiliary magnetic pole layer $101b_7$. The trailing shield portion $101b_{7a}$ is opposed to the end portion near the ABS side face of the main magnetic pole layer $101b_2$ through the gap layer $101b_3$. The provision of the trailing shield portion $101b_{7a}$ makes the magnetic field gradient steeper between the end portion of the trailing shield portion $101b_{7a}$ and the end portion of the main magnetic pole layer $101b_2$. As a result, jitter of the signal output becomes smaller, and therefore, the read error rate can be reduced.

The write coil layer $101b_5$ is formed so as to pass in its one turn at least between the main magnetic pole layer $101b_2$ and the auxiliary magnetic pole layer $101b_7$. The write coil insulation layer $101b_6$ surrounds the write coil layer $101b_5$ and electrically insulates the write coil layer $101b_5$ from the main magnetic pole layer $101b_2$ and the auxiliary magnetic pole layer $101b_7$.

A backing coil portion $101b_1$ is provided in the inductive write head element $101b$ between the inter-element shield layer $11i$ (heating unit $11c$) and the main magnetic pole layer $101b_2$. The backing coil portion $101b_1$ consists of a baking coil layer $101b_{1a}$ and a backing coil insulation layer $101b_{1b}$ and generates a magnetic flux that cancels a magnetic flux loop that is generated from the main magnetic pole layer $101b_2$ and the auxiliary magnetic pole layer $101b_7$ and passes through the upper and lower shield layers in the MR read head element $11a$, in order to prevent Wide Adjacent Track Erasure (WATE), which is unwanted write or erase operation on a magnetic disk.

A testing method of such thin-film magnetic head is the quite same as that of the thin-film magnetic head shown in FIGS. 2 and 3.

Figure 11:
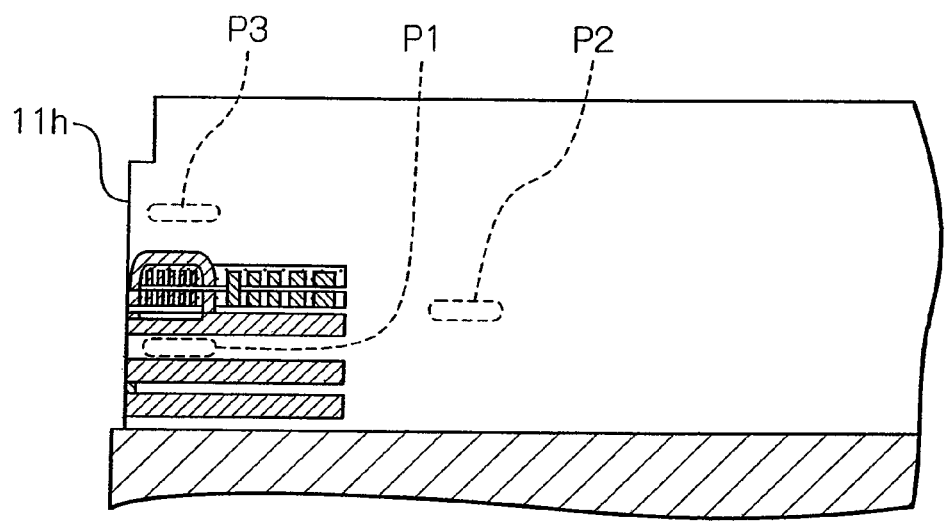
FIG. 11 is a sectional view corresponding to an A-A sectional view of FIG. 1, illustrating further configuration of a thin-film magnetic head to which a testing method according to the present invention is applicable.

FIG. 11 corresponds to an A-A sectional view of FIG. 1 and illustrates further configuration of a thin-film magnetic head to which a testing method according to the present invention is applicable.

In this embodiment, a position of the heating unit differs from that in the aforementioned embodiment. The heating unit in this embodiment may be arranged at any of positions P1 to P3 shown in FIG. 11. Namely, the heating unit may be arranged at the position P1 near the ABS side face $11h$ between the MR read head element and the inductive write head element, at the position P2 in the overcoat layer opposite to the ABS side face $11h$ with respect to the MR read head element and the inductive write head element, or at a position P3 in the overcoat layer near the ABS side face $11h$ directly above the inductive write head element. Particularly, if the heating unit is disposed at the position P1, the efficiency of temperature rise of the MR read head element with respect to supplied power will be higher than that disposed at other positions, and therefore the head element can be tested with lower supplied power. Further, in this case disposed at the position P1, if the heating unit also serves as a flying-height adjustment element, the efficiency in protrusion of the end of the magnetic head element will be increased resulting the protruding response to improve.

Figure 12:
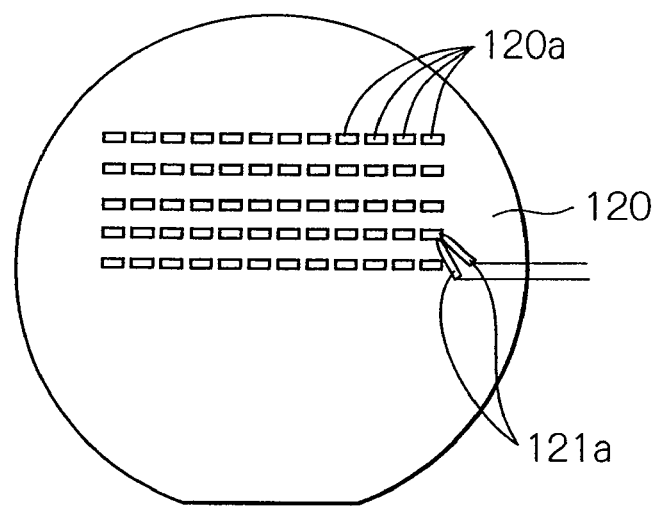
FIG. 12 is a view schematically illustrating a part of configuration for testing a thin-film magnetic head as another embodiment according to the present invention.

FIG. 12 schematically illustrates a part of configuration for testing a thin-film magnetic head as another embodiment according to the present invention.

In the above-mentioned embodiment of FIGS. 1-11, the test for checking whether a thin-film magnetic head is a defective head providing high-temperature noises or not is performed for each head formed on a magnetic head slider individually separated. Contrary to this, in this embodiment, the test for checking whether a thin-film magnetic head provides is a defective head providing high-temperature noises or not is performed for each head formed on a wafer. In FIG. 12, reference numeral 120 denotes a wafer, 120a denotes many of thin-film magnetic heads arranged in matrix on the wafer 120, each head having an MR read head element and an inductive write head element, and 121a denotes a pair of probes capable of coming into electrical contact with a pair of terminal pads (not shown) that are electrically connected to the MR read head element. Configurations, operations and advantages of a testing apparatus in this embodiment are the same as those in the embodiment of FIGS. 1-11.

Figure 13:
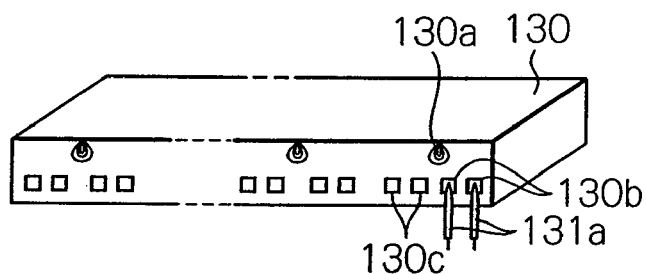
FIG. 13 is a view schematically illustrating a part of configuration for testing a thin-film magnetic head as further embodiment according to the present invention.

FIG. 13 schematically illustrates a part of configuration for testing a thin-film magnetic head as further embodiment according to the present invention.

In the above-mentioned embodiment of FIGS. 1-11, the test for checking whether a thin-film magnetic head is a defective head providing high-temperature noises or not is performed for each head formed on a magnetic head slider individually separated. Also, in the embodiment of FIG. 12, the test is performed for each head arranged in a wafer. Contrary to these, in this embodiment, the test for checking whether a thin-film magnetic head is a defective head providing high-temperature noises or not is performed for each head formed on a bar member. In FIG. 13, reference numeral 130 denotes a bar member with a plurality of thin-film magnetic heads 130a connected in series and aligned with each other, each head having a MR read head element and an inductive write head element. The bar member 130 is obtained by cutting a wafer on which many of thin-film magnetic heads are formed to arrange in matrix into a plurality of bar members and then by lapping each bar member to adjust an MR height. Each thin-film magnetic head 130a in the bar member 130 has the MR read head element, the inductive write head element, a pair of terminal pads 130b electrically connected to the MR read head element, and a pair of terminal pads 130c electrically connected to the inductive write head element. The test is performed by electrically contacting a pair of probes 131a with the pair of terminal pads 130b for an MR read head element of a thin-film magnetic head to be tested on the bar member 130. Configurations, operations and advantages of a testing apparatus in this embodiment are the same as those in the embodiment of FIGS. 1-11.

Figure 14:
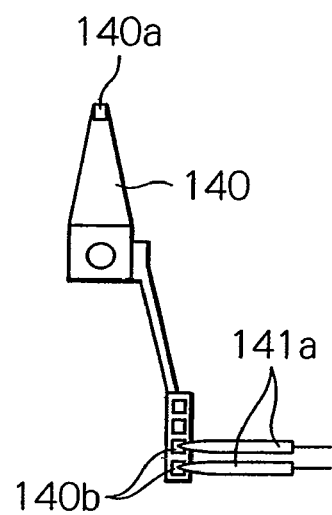
FIG. 14 is a view schematically illustrating a part of configuration for testing a thin-film magnetic head as still further embodiment according to the present invention.

FIG. 14 schematically illustrates a part of configuration for testing a thin-film magnetic head as still further embodiment according to the present invention.

In the above-mentioned embodiment of FIGS. 1-11, the test for checking whether a thin-film magnetic head is a defective head providing high-temperature noises or not is performed for each head formed on a magnetic head slider individually separated. Also, the test is performed for each head arranged in a wafer in the embodiment of FIG. 12, and for each head aligned on a bar member in the embodiment of FIG. 13. Contrary to these, in this embodiment, the test for checking whether a thin-film magnetic head is a defective head providing high-temperature noises or not is performed for each head formed on a magnetic head slider assembled with a support member or suspension as a head suspension assembly. In FIG. 14, reference numeral 140 denotes a head suspension assembly formed by mounting a magnetic head slider and a wiring member on a suspension, 140a denotes a magnetic head slider with a thin-film magnetic head mounted on the assembly 140 and provided with an MR read head element and an inductive write head element, 140b denotes a pair of terminal pads electrically connected to the MR read head element, which are a part of the wiring member, and 141a denotes a pair of probes capable of coming into electrical contact with the pair of terminal pads 140b. Configurations, operations and advantages of a testing apparatus in this embodiment are the same as those in the embodiment of FIGS. 1-11.

Figure 15:
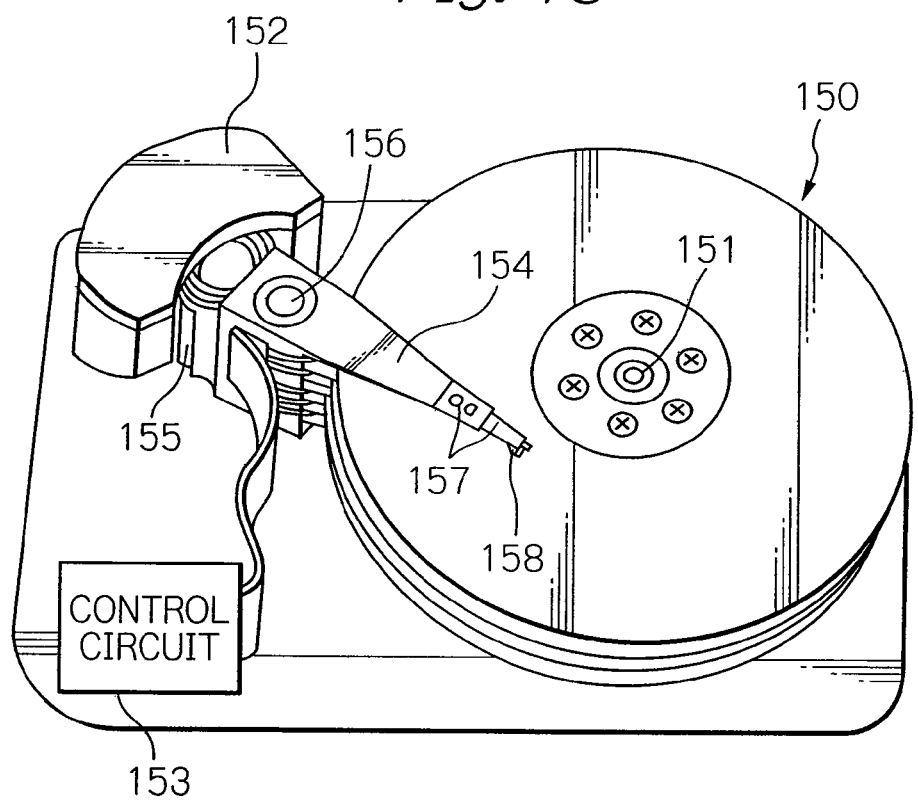
FIG. 15 is a perspective view schematically illustrating a configuration of main components of a magnetic disk drive apparatus according to an embodiment of the present invention.
Figure 16:
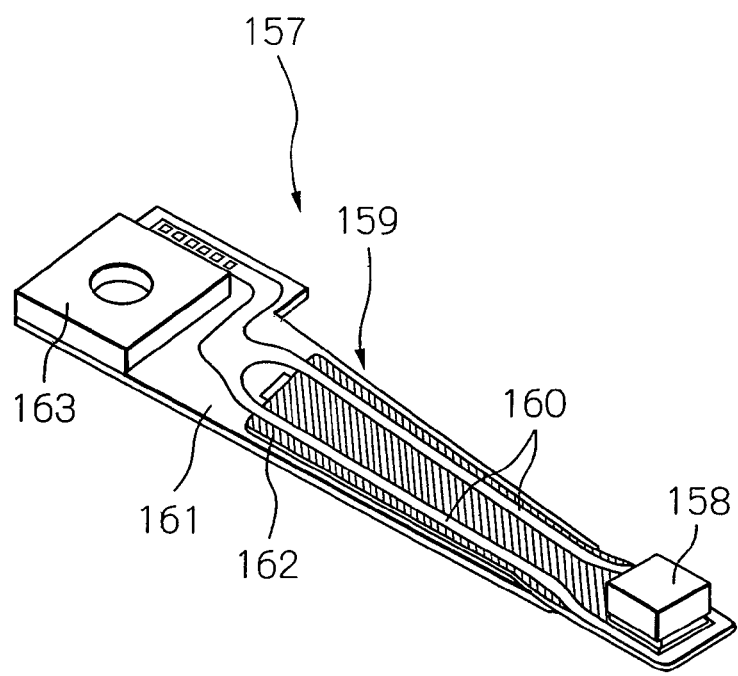
FIG. 16 is a perspective view schematically illustrating a configuration of a magnetic head assembly provided in the magnetic disk drive apparatus shown in FIG. 15.

FIG. 15 schematically illustrates a configuration of main components of a magnetic disk drive apparatus according to an embodiment of the present invention, and FIG. 16 schematically illustrates a configuration of a magnetic head assembly provided in the magnetic disk drive apparatus shown in FIG. 15.

In FIG. 15, reference numeral 150 denotes a plurality of magnetic disks that rotate about a rotation axis of a spindle motor 151, 152 denotes an assembly carriage device for positioning a thin-film magnetic head or magnetic head slider above a track, and 153 denotes a control circuit for controlling read/write operations of the thin-film magnetic head and heating operations and checking operations of the heating unit of the thin-film magnetic head, respectively.

Provided in the assembly carriage device 152 is a plurality of drive arms 154. The drive arms 154 are stacked along a pivot-bearing axis 156 and driven by a voice coil motor (VCM) 155 to angular-pivot about the axis 156. A head gimbal assembly (HGA) 157 that is one aspect of a magnetic head assembly is attached at the end of each drive arm 154. Provided on each HGA 157 is a magnetic head slider 158 in such a manner that it faces the surface of each magnetic disk 150. In modification, a single magnetic disk 150, a single drive arm 154 and a single HGA 157 may be provided on the magnetic disk drive apparatus.

As shown in FIG. 16, the HGA consists of a suspension 159, the magnetic head slider 158 provided with an inductive write head element and an MR read head element and fixed at the end of the suspension 159, and a wiring member 160. Terminal electrodes of the thin-film magnetic head 158 are electrically connected to one end of the wiring member 160.

The suspension 159 mainly consists of a load beam 161 generating loads applied to the magnetic head slider 158, a resilient flexure 162 fixed on and supported by the load beam 161, a base plate 163 provided on the base of the load beam 161, and a wiring member 160 which is provided on the flexure 162 and the load beam 161 and provided with trace conductors and connection pads electrically connected to the ends of the trace conductors.

It will be understood that the structure of the suspension in the magnetic head assembly of the present invention is not limited to the one described above.

The thin-film magnetic head 158 or 11 may be designed for longitudinal magnetic recording as shown in FIGS. 2 and 3 or for perpendicular magnetic recording as shown in FIG. 10. Depending on the recording type used, a magnetic disk 150 for longitudinal magnetic recording or perpendicular magnetic recording is used. In either case, the thin-film magnetic head 158 or 11 includes a heating unit 11c used for applying heat and stress to the MR effect element to evaluate the condition of the thin-film magnetic head 158. The heating unit may also function as a flying-height adjustment element for adjusting the flying height of the thin-film magnetic head 158 or 11 from the magnetic disk 150.

Figure 17:
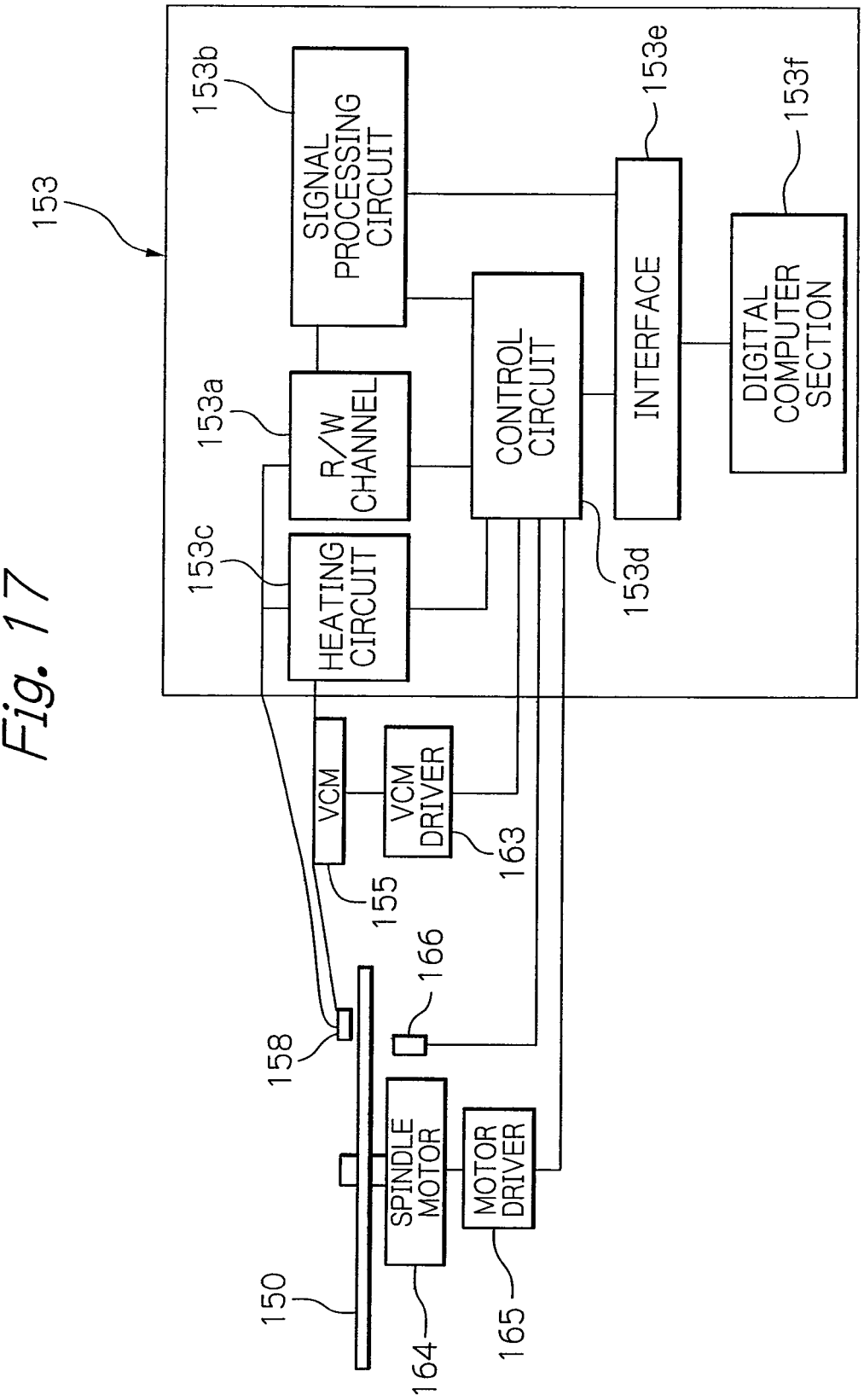
FIG. 17 is a block diagram illustrating a circuit configuration of a control circuit provided in the magnetic disk drive apparatus shown in FIG. 15.

FIG. 17 illustrates a circuit configuration of the control circuit 153 provided in the magnetic disk drive apparatus shown in FIG. 15.

In the figure, reference numeral 153a denotes an read/write (R/W) channel, 153b denotes a signal processing circuit for processing the output received from the MR read head element via the R/W channel 153a, 153c denotes a heating circuit for supplying electric power to the heating unit 11c (FIGS. 2 and 3) to control the amount of heat and the intensity of stress applied to the MR read head element, 153d denotes a control circuit for controlling the R/W channel 153a, the signal processing circuit 153b and the heating circuit 153c, 153e denotes an interface, 153f denotes a digital computer section for evaluating the condition of the thin-film magnetic head 158 or 11 on the basis of the noise output measured by the signal processing circuit 153b, 163 denotes a VCM driver for driving a VCM 155, 164 denotes a spindle motor, 165 denotes a motor driver for driving the spindle motor 164, and 166 denotes a temperature sensor, respectively.

Read/write operations are controlled as follows. A data signal to be written is sent to the inductive write head element of the thin-film magnetic head 158 from the R/W channel 153a under the control of the control circuit 153d. The thin-film magnetic head 158 writes the data signal on the rotating magnetic disk 150. A data signal read by the MR read head element of the thin-film magnetic head 158 from the rotating magnetic disk 150 is sent to the R/W channel 153a under the control of the control circuit 153d. The read/write positions on the magnetic disk 150 are controlled by driving the VCM 155 through the VCM driver 163 under the control of the control circuit 153d as appropriate.

Heating operations is controlled as follows. First, a heating current is fed from the heating circuit 153c under the control of the control circuit 153d to the heating unit 11c in the thin-film magnetic head 158 or 11. The heating current may be a direct current used only for heating, or a pulsing current used for evaluation. The heating current may be controlled with reference to a temperature measured by the temperature sensor 166 so that the temperature of the MR read head element reaches a predetermined value (for example 70° C.).

Evaluation operations is performed as well as done in the embodiment of FIGS. 1 to 11 by applying a pulsing power as shown in FIG. 5 to the heating unit 11c, by measuring a noise output, by calculating a rate of change in the measured noise output, and by comparing the calculated rate of change with a threshold value to discriminate whether the thin-film magnetic head provides noises. Thus, it is possible to make diagnosis whether the head is deteriorated or not. Concrete testing and discriminating processes are the same as these in the embodiment of FIGS. 1 to 11.

The signal processing circuit 153b or the digital computer section 153f may have a head condition indicating section for indicating the condition of the evaluated or determined thin-film magnetic head. For example, the head-condition indicating section may display an alarm or alarms at different levels on a monitor of a computer in which the magnetic disk drive apparatus is provided.

As described in detail, the magnetic disk drive apparatus according to the present invention can appropriately perform a test of a thin-film magnetic head mounted therein with an MR read head element, under a high-temperature and strong stress environment although performing of such test was quite difficult according to the conventional testing method. As a result, it is possible to make a prediction of malfunction of the thin-film magnetic head before the fact.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A noise-testing method for a thin-film magnetic head with a magnetoresistive effect read head element and a heating unit capable of applying a heat and a stress to said magnetoresistive effect read head element, comprising the steps of:
    applying alternately and discontinuously with each other an electrical power having a first level and an electrical power having a second level higher than said first level to said heating unit; and
    evaluating said thin-film magnetic head by measuring a noise output or noise outputs obtained from said magnetoresistive effect read head element when the electrical power or the electrical powers are applied to said heating unit.

2. The noise-testing method as claimed in claim 1, wherein the evaluating step comprises a step of discriminating whether said thin-film magnetic head is a defective head providing noises or not by measuring a noise output from said magnetoresistive effect read head element when the electrical power with the second level is applied to said heating unit.

3. The noise-testing method as claimed in claim 1, wherein the evaluating step comprises a step of discriminating whether said thin-film magnetic head is a defective head providing noises or not by obtaining a difference between a noise output obtained from said magnetoresistive effect read head element when the electrical power with the first level is applied to said heating unit and a noise output obtained from said magnetoresistive effect read head element when the electrical power with the second level is applied to said heating unit.

4. The noise-testing method as claimed in claim 3, wherein the discriminating step comprises discriminating whether said thin-film magnetic head is a defective head providing noises or not by comparing $(N_{ON}-N_{OFF})/N_{OFF}$ with a predetermined threshold value, where $N_{OFF}$ is a noise output obtained from said magnetoresistive effect read head element when the electrical power with the first level is applied to said heating unit, and $N_{ON}$ is a noise output obtained from said magnetoresistive effect read head element when the electrical power with the second level is applied to said heating unit.

5. The noise-testing method as claimed in claim 4, wherein said predetermined threshold value is 0.35.

6. The noise-testing method as claimed in claim 1, wherein the applying step comprises a step of applying to said heating unit an electrical power with the first level and a first duration and an electrical power with the second level and a second duration that is equal to said first duration.

7. The noise-testing method as claimed in claim 1, wherein the applying step comprises a step of alternately applying to said heating unit an electrical power with the first level and an electrical power with the second level for three times or more.

8. The noise-testing method as claimed in claim 7, wherein the applying step comprises the step of alternately applying to said heating unit an electrical power with the first level and an electrical power with the second level for eight times or less.

9. The noise-testing method as claimed in claim 1, wherein the applying step comprises a step of intermittently applying to said heating unit an electrical power with the second level that is higher than zero level.

10. The noise-testing method as claimed in claim 1, wherein said heating unit comprises a flying-height adjustment element for adjusting a flying height of said thin-film magnetic head by protruding an end face at an air bearing surface side due to its thermal expansion.

11. A computer program product, embodied on a non-transitory computer readable-medium, for noise-testing a thin-film magnetic head with a magnetoresistive effect read head element and a heating unit capable of applying a heat and a stress to said magnetoresistive effect read head element, comprising the computer codes of:

applying alternately and discontinuously with each other an electrical power having a first level and an electrical power having a second level higher than said first level to said heating unit; and evaluating said thin-film magnetic head by measuring a noise output or noise outputs obtained from said magnetoresistive effect read head element when the electrical power or the electrical powers are applied to said heating unit.

12. The computer program product as claimed in claim 11, wherein the evaluating computer code comprises a computer code of discriminating whether said thin-film magnetic head is a defective head providing noises or not by comparing $(NO_{ON}-N_{OFF})/N_{OFF}$ with a predetermined threshold value, where $N_{OFF}$ is a noise output obtained from said magnetoresistive effect read head element when the electrical power with the first level is applied to said heating unit, and $N_{ON}$ is a noise output obtained from said magnetoresistive effect read head element when the electrical power with the second level is applied to said heating unit.

13. The computer program product method as claimed in claim 11, wherein the applying computer code comprises a computer code of intermittently applying to said heating unit an electrical power with the second level that is higher than zero level.

14. A magnetic disk drive apparatus with a element-testing function, comprising:

at least one magnetic disk;

a thin-film magnetic head with a magnetoresistive effect read head element for reading out data signal from said at least one magnetic disk, and a heating unit capable of applying a heat and a stress to said magnetoresistive effect read head element;

a support member for supporting said thin-film magnetic head;

means for applying alternately and discontinuously with each other an electrical power having a first level and an electrical power having a second level higher than said first level to said heating unit; and means for evaluating said thin-film magnetic head by measuring a noise output or noise outputs obtained from said magnetoresistive effect read head element when the electrical power or the electrical powers are applied to said heating unit.

15. The magnetic disk apparatus as claimed in claim 14, wherein the evaluating means comprises means for discriminating whether said thin-film magnetic head is a defective head providing noises or not by comparing $(N_{ON}-N_{OFF})/N_{OFF}$ with a predetermined threshold value, where $N_{OFF}$ is a noise output obtained from said magnetoresistive effect read head element when the electrical power with the first level is applied to said heating unit, and $N_{ON}$ is a noise output obtained from said magnetoresistive effect read head element when the electrical power with the second level is applied to said heating unit.

16. The magnetic disk apparatus as claimed in claim 14, wherein the applying means comprises means for intermittently applying to said heating unit an electrical power with the second level that is higher than zero level.

* * * * *